Oct. 26, 1965 C. V. JAKOWATZ 3,214,699

SELF-ADAPTING FILTER FOR WAVEFORMS SIMILAR IN SHAPE

Filed Aug. 14, 1963

Inventor:
Charles V. Jakowatz, by John P. DeHart
His Attorney.

3,214,699

SELF-ADAPTING FILTER FOR WAVEFORMS SIMILAR IN SHAPE

Charles V. Jakowatz, Schenectady, N.Y., assignor to General Electric Company, a corporation of New York Filed Aug. 14, 1963, Ser. No. 302,150
9 Claims. (Cl. 328—149)

This invention relates to apparatus for recognizing unknown signals similar in shape but of varying time duration.

In my copending application for an Adaptive Filter, Serial No. 7,276, filed February 8, 1960, now Patent 3,-114,884 and assigned to the assignee of the present invention, an apparatus is disclosed for recognizing an unknown repetitive signal buried in noise. The signal may, for example, comprise a radar return which is indistinguishable to the human observer. The signal is withdrawn from its background noise by storing a portion of noisy input as a reference, comparing further areas of input therewith until similarity or correlation is indicated, and pursuant to such indication proceeding to alter the stored reference by combining therewith portions of input which give rise to indications of similarity. The stored reference is improved over and over again and storage becomes an increasingly better representation of the unknown signal, while noise factors average out because of their incoherent nature.

The adaptive filter is effective in withdrawing a repetitive signal from background noise when each repetition of the signal is essentially identical. There are instances, however, when an unknown repetitive signal has the same characteristic shape upon each repetition, but is expanded or contracted on a time scale. For example, in speech recognition, electrical signals representing a particular vowel sound have the same characteristic shape but are frequently expanded or contracted versions of one another. The same holds true for optical recognition of alphanumeric characters wherein repetitive electrical signals characterize a particular letter, number or portion thereof. The alpha-numeric character represented may be large or small, and in some instances somewhat differently formed, but still the character should be capable of producing a similarly shaped electrical representation. Another similar problem occurs in the case of output signals received from apparatus having a variable speed of operation, or in the instance of signals received from moving objects and therefore subject to a doppler increase or decrease in wavelength.

It is therefore a principal object of the present invention to provide an improved apparatus for recognizing unknown signals similar in shape but of varying time duration.

In accordance with a principal feature of the present invention, an electrical input containing an unknown signal is applied to an adaptive filter including means for variably altering the relative time scale between the stored version of unknown signal, and the new electrical input compared therewith, whereby compressed and expanded versions of an unknown signal contained in electrical input are recognized.

In a particular example of the adaptive filter in accordance with the present invention, there is included storage means for storing a reference version of an unknown signal, and temporary storage means provided with sampling means for sampling new electrical input at spaced intervals of time. Further sampling means also sample electrical input at spaced intervals of time different from the first mentioned intervals of time. New electrical input thus sampled at varying time intervals is compared with the stored version of the reference unknown signal, and when sufficient correlation is attained, the time sampled input which most nearly matches the stored version of the unknown signal is combined with the stored version of the unknown signal.

In accordance with a particular feature of the present invention, the correlation between the time sampled electrical input and the stored version of the unknown signal is tested against a threshold value which the correlation must exceed before a particular time sampled electrical input is combined with the stored version of the unknown signal. The value of such correlation threshold is maintained the same for all sampling means even though operating at differently spaced intervals of time in order to continuously upgrade the stored version of the unknown signal.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
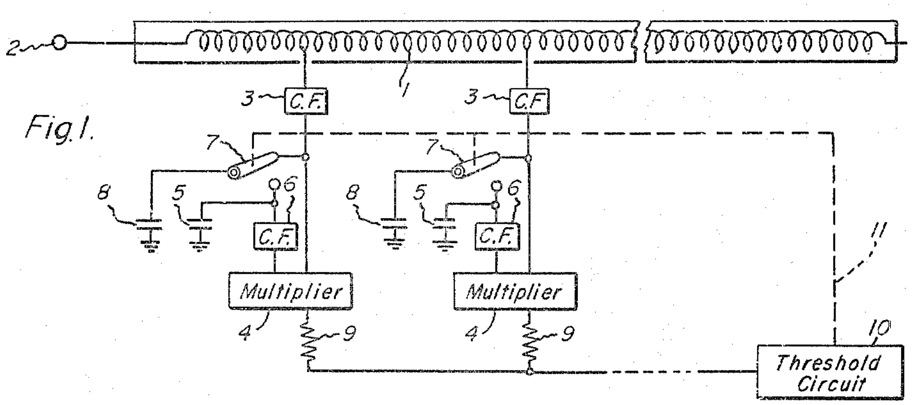
FIG. 1 is a simplified schematic diagram of the prior adaptive filter.

Referring to FIG. 1, an adaptive filter of the type disclosed and claimed in my aforementioned application Serial No. 7,276, includes a delay line 1, coupled to a source of electrical input at terminal 2. Cathode follower sampling means 3 tapped at spaced points along the delay line each provide an input for one of the multipliers 4 while the remaining input to each multiplier 4 is derived from a storage capacitor 5 through cathode follower 6. The outputs of multiplier 4 are summed through a summing network consisting of resistors 9 and applied as the input to a threshold circuit 10 arranged to actuate contacts 7, as indicated by dashed line 11, when the sum of the multiplications reaches a predetermined value. Single pole, double throw contacts 7 normally connect a sampling capacitor 8 to receive a delay line sample through cathode follower sampling means 3 in the normal switching position, and connect a sampling capacitor 8 directly across a storage capacitor 5 in the activated switching position.

As specifically disclosed in my aforementioned application, the sum applied to the threshold circuit 10 approximates the cross correlation function between the element of electrical input distributed along delay line 1 and corresponding stored signal elements on storage capacitors 5. When the cross correlation function reaches a predetermined threshold, a predetermined degree of comparison between the incoming electrical input and stored values has been attained, and therefore threshold circuit 10 acts to close contacts 7 from the upper position to the lower position thereby connecting the respective sampling and storage capacitors 8 and 5 together. The capacitor 8 voltage will approximately equal a sample voltage at the corresponding delay line tap. When the capacitors are connected together for a period of time, a charge equilibrium condition therebetween will be reached such that the stored value of voltage on storage capacitor 5 is influenced by the new sample value on sampling capacitor 8. Sampling capacitor 8 is thereupon reconnected to cathode follower sampling means 3 through a contact 7 to reassume the sample voltage along the delay line. After a number of occurrences of a repetitive signal, a fairly accurate representation thereof will be achieved on storage capacitors 5, even though the signal is initially unknown and somewhat obscured by background noise. A repetitive signal as referred to herein is not necessarily a periodic one.

Initially, since the incoming signal is unknown, the threshold established by threshold circuit 10 is set to be very low; however, as a better and better representation of the signal becomes stored on storage capacitors 5, the threshold level of threshold circuit 10 is raised in response thereto, so it will become increasingly likely that switch contacts 7 are actuated in response to the occurrence of the repetitive signal rather than noise.

Although the storage capacitors 5 store an increasingly valid representation of the input signal, the signal in storage is able to follow slow changes in form and relative time position of an input signal. It can be shown the stored value on a storage capacitor 5 will be more nearly representative of the more recent samples from capacitor 8, due to the interaction of capacitors 5 and 8 when connected together by contacts 7.

The above described filter is effective for recognizing a previously unknown repetitive signal buried in noise, but the signal most readily recognized is one of the same shape and of the same time duration. That is, the prior adaptive filter in general recognized one signal $f(t)$ as a repetition of another $g(t)$, if $f(t)=g(t)$. In accordance with the present invention, a signal is recognized as a repetition of another if $f(t)=g(at)$, i.e. if the two signals are the same except one is a stretched version of the other.

In accordance with the present invention, means are provided in an adaptive filter for expanding the relative time scale of either the sampled electrical input or the reference signal contained in storage whereby compressed and expanded versions of the same intelligence contained in electrical input may be detected. In a preferred particular embodiment illustrated in FIG. 2, the electrical input derived at terminal 2 is differently expanded or spread in time by means of similarly constructed delay lines 12, 13, 14 and 15 each supplied from input terminal 2. Any individual delay line, for example delay line 12 together with storage capacitors 5 and associated intervening circuitry, forms an adaptive filter of substantially the same construction and operation as the FIG. 1 filter, particularly as respects elements referred to by like reference numerals. Electrical input from terminal 2 in passing down delay line 12 is sampled at spaced intervals of time by means of sampling means 3 connected to delay line taps 17, 18 and 19. When a signal appears in the electrical input which is substantially the same as the reference signal previously stored in common storage 16, the summation of outputs from multipliers 4 will exceed the threshold level of threshold circuit 10 to actuate contacts 7. Contacts 7 then connect sampling capacitors 8 to storage capacitors 5 and the latest sampling of the unknown signal is added to storage.

Electrical input from terminal 2 passing down a second delay line 13 is also compared with the reference signal contained in common memory device 16, but comparison is on a somewhat more time compressed basis. Sampling means 3 associated with delay line 13 are connected to line 13 at spaced intervals at taps 20, 21 and 22; however, taps 20–22 are spaced further apart than taps 17–19 of delay line 12. Therefore the same signal appearing in electrical input will seem more time compressed as sampled from taps 20–22.

Delay line 14 is sampled at taps 23–25, even further spaced than taps 20–22, and the same electrical signal passing through delay line 15 is sampled at taps 26–28, spaced yet further apart. Thus, the electrical input sampled from delay line 15 and compared with common memory 16 is a much more compressed version of electrical input. The number of taps and spacing are determined by the bandwidth of the input wave and the expected range of signal stretching, as will be understood by those skilled in the art.

Considered from the viewpoint of line 15, the electrical signal sampled from lines 14, 13 and 12 is a successively expanded version of electrical input derived through line 15.

The threshold circuits 10 are coupled as indicated at 29 to have a common threshold value, which is arranged to be the largest threshold as attained in any threshold circuit 10. As electrical input entering through any of the delay lines sufficiently correlates with the contents of common memory 16, to indicate the presence of the previously repeated signal, the threshold value associated with that delay line is raised. This threshold value, which is established in the corresponding threshold circuit 10, is raised in proportion to the amount the correlation has exceeded the threshold, as described in my aforementioned copending application Serial No. 7,276.

In accordance with the present invention, the storage element holding the threshold value for each threshold circuit 10 is preferably coupled to similar storage elements in each of the other threshold circuits 10 whereby the threshold value for each circuit is the same. Thus the higher quality demand is made upon successive electrical input received through any of the delay lines before a combination between electrical input and storage occurs. As also disclosed in my aforementioned application, the threshold value will be arranged to decay with time; for example, the storage element holding the threshold value may comprise a slowly discharging capacitor. If the unknown signal does not frequently repeat, or if the quality of correlation decreases, the threshold value will automatically decrease. Under desirable circumstances, however, the value of threshold usually increases as the signal repeats so the increasing quality demand is made on the correlation before the electrical input is added to storage. In this way storage comes to hold an increasingly accurate version of the unknown signal. In some cases it is desirable to modify the peak value of correlation before making a decision regarding maximum correlation as between delay lines. The correlation of common memory with the contents of any one delay line may in such case be altered as a function of the delay line length, for example, to take into account differences in signal energies per degree of freedom.

The general operation in accordance with the present invention proceeds as follows. A reference value of electrical input from terminal 2 is entered into common storage 16 through one of the delay lines 12–15. The initial threshold value will be quite low inasmuch as it will not yet have been raised by successful correlation. Electrical input is then continuously compared with the reference portion of input stored in common memory 16. Favorable comparison of electrical input with common storage results in the successfully compared portion of input being combined with the reference in common storage. Such successful comparison and addition of electrical input to storage may occur for the input as sampled along any of the delay lines 12–15. A repetition of a signal in electrical input will be added to storage even though succesisve repetitions thereof are somewhat compressed or expanded in time. An expanded version of the input signal will compare with the reference in memory as it passes along a delay line having more closely spaced taps, and then the contacts 7 associated with this delay line will add the sampling from this delay line to storage. Similarly a contracted version of the repeated signal may compare with memory as it passes along a delay line whose taps are spaced further apart. Thus input delay lines of varying tap spacings compensate for stretch or compression occurring in the input signal.

Figure 2:
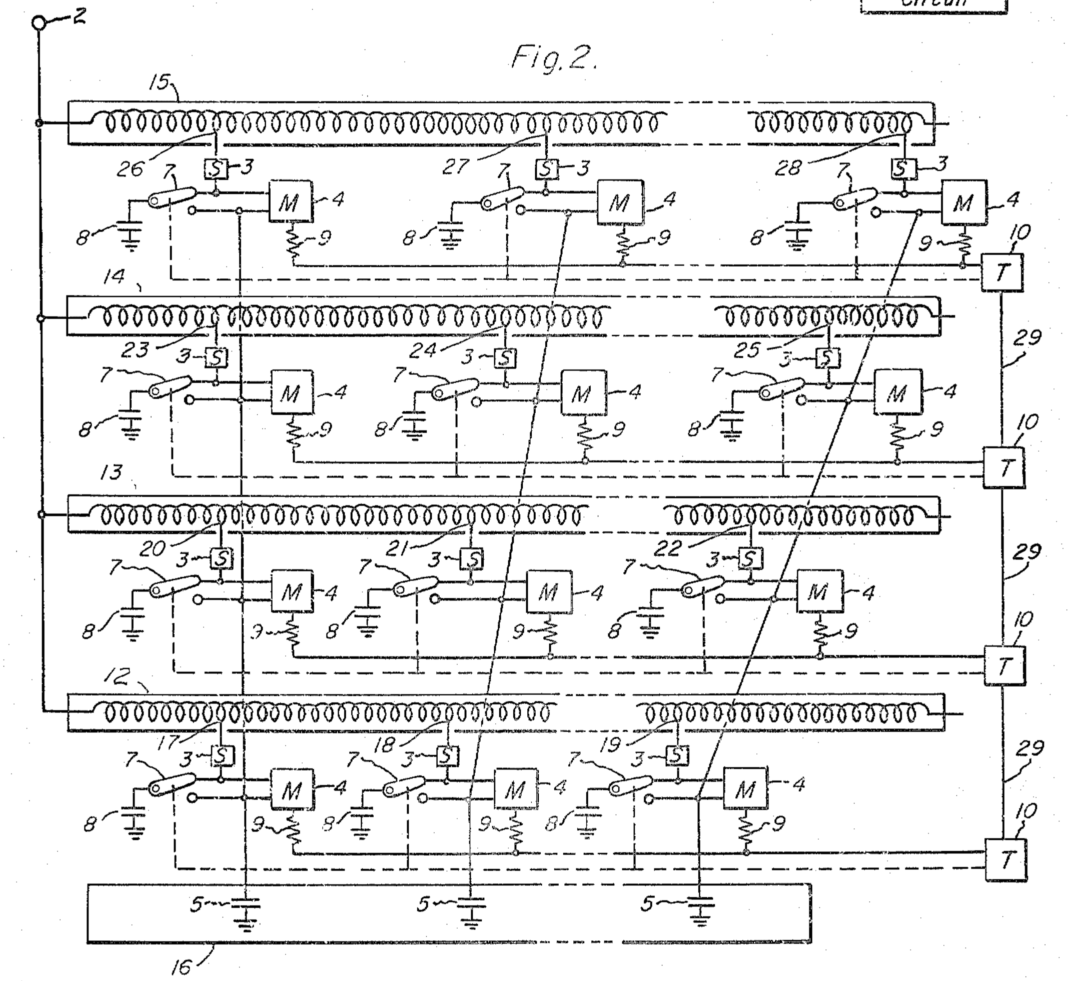
FIG. 2 is a schematic diagram of an adaptive filter in accordance with the present invention for recognizing an unknown signal of varying time duration.

Several variations of the FIG. 2 embodiment are possible. For example the separate delay lines 12–15, illustrated in FIG. 2 may be replaced with a single delay line. This single delay line is then tapped at all the time spacings shown for the various delay lines in the FIG. 2 apparatus.

In accordance with another variation of the present invention, a single input delay line is employed in conjunction with several common memory devices 16. In such case a reference portion of electrical input is entered into respective memory devices in variously contracted and expanded form. When electrical input compares favorably with the contents of one memory device, such input is combined with the favorably comparing memory and the contents of all memory devices are altered to contain the upgraded version of input. The value of threshold is correspondingly modified.

In the concurrently filed application of Clarence L. Coates and Philip M. Lewis, Serial No. 302,214, filed August 14, 1963, "Apparatus for Recognizing Waveforms of Variable Time Duration," and assigned to the assignee of the present invention, there is disclosed and claimed apparatus to which the present invention is generic. In accordance with the invention of Coates and Lewis, electrical input is repeatedly sampled on a logarithmic time scale, for example as electrical input passes down a delay line with logarithmically spaced taps. A time series of input signal replicas is thereby established and may be applied as input to a somewhat simplified adaptive filter.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. An apparatus for signal recognition comprising electrical input means, means for storing a reference signal, means for comparing an electrical input signal with said reference signal to produce a voltage indicative of the correlation therebetween and combining with said reference signal quantities proportioned to the electrical input signal which compares favorably with said reference signal, and means for expanding the relative time scale of one of the signals compared whereby compressed and expanded versions of unknown intelligence contained in said electrical input signal are capable of comparing favorably with said reference signal.

2. Apparatus for signal recognition comprising electrical input means, means for storing a reference signal, means for comparing electrical input with said reference signal to produce a voltage indicative of the correlation therebetween and combining with said reference signal quantities proportioned to electrical input which compares favorably with said reference signal, and means for altering the time duration of said electrical input by simultaneously prolongating the time spread of said electrical input to differing degrees whereby compressed and expanded versions of an unknown signal contained in said electrical input are capable of comparing favorably with said reference signal.

3. An adaptive system for recognizing a repetitive signal of changing duration contained in electrical input comprising a first plurality of sampling means energized from said input and continuously sampling voltages of said input at spaced intervals of time, further pluralities of sampling means energized from said input and continuously sampling voltages of said input at spaced intervals of time corresponding to said first mentioned spaced intervals but proportionately prolongated on a time scale, a plurality of storage means each associated with a corresponding one of said first mentioned sampling means and corresponding ones of said further sampling means for storing voltages indicative of said signal, correlation means for producing respective outputs indicative of correlation between the voltages in the respective storage means and sampling means, and means for altering the stored voltages with voltages sampled at a given plurality of sampling means when correlation thereof with said stored voltages exceeds a predetermined value.

4. An adaptive system for recognizing a repetitive signal of non-uniform time duration contained in electrical input comprising a first temporary delay means, means impressing said electrical input on said first temporary delay means, a first plurality of sampling means energized from said first temporary delay means continuously sampling voltages of said electrical input at spaced intervals of time, a plurality of further sampling means energized from temporary delay means continuously sampling voltages of said electrical input at spaced intervals of time proportionately larger than said first mentioned intervals of time, a plurality of storage means corresponding to said sampling means for storing voltages indicative of said signal, correlation means for producing an output indicative of the correlation between the voltages in the respective storage means and corresponding sampling means, and means for adding a proportion of sampling means voltage to said storage means when indicated correlation therebetween exceeds a predetermined threshold.

5. An adaptive system for recognizing a signal contained in electrical input comprising: plural delay means receiving in parallel said electrical input and each having plurality of taps for delivering said input at spaced intervals of time, wherein the taps corresponding to different of said delay means are spaced for a different period of delay; sampling means connected to said taps for sampling voltages indicative of said input; storage means for storing voltages indicative of said signal; correlation means corresponding to a given delay means for determining the correlation between stored voltages and the sampled voltages for a given delay means; a threshold detector corresponding to each delay means for receiving the output of the correlation means corresponding to each delay means, said threshold means being operative only when a predetermined threshold value is exceeded for transferring voltages from sampling means to storage means as the correlation between stored voltages and sampled voltages for a given delay means exceeds said threshold value; and coupling means between said threshold means for establishing a common threshold value for all said threshold means.

6. An adaptive system for recognizing a repetitive signal of changing duration contained in electrical input comprising a plurality of time delay means receiving said input and having differing effective delays for producing different spreads in said electrical input, means for storing a reference signal, means for simultaneously comparing said stored reference signal with differently delayed versions of said electrical input from the different time delay means, means ascertaining the correlation between differently delayed inputs from different delay means and said reference signal, threshold means corresponding to each of said delay means and each capable of establishing a threshold value, said threshold means being interconnected so that a common threshold value prevails for all said threshold means, and means for combining electrical input, as delayed by a particular delay means, with said reference signal when the delayed electrical signal from said particular delay means correlates with said reference signal in excess of said threshold value.

7. An adaptive system for recognizing a repetitive signal of changing duration contained in electrical input comprising a plurality of time delay means receiving said input and having differing effective delays for producing different spreads in said electrical input; means for storing a reference signal; means for simultaneously comparing said stored reference signal with differently delayed versions of said electrical input from the different time delay means; means ascertaining the correlation between differently delayed inputs from different delay means and said reference signal; threshold means corresponding to each of said delay means and each capable of establishing a threshold value, said threshold means being interconnected so that a common threshold value prevails for all said threshold means; means for combining electrical input, as delayed by a particular delay means, with said reference signal when the delayed electrical signal from said particular delay means correlates with said reference signal in excess of said threshold value; and means for raising said threshold value in all said threshold means when said correlation exceeds the previous threshold value.

8. An adaptive system for recognizing a repetitive signal of changing duration contained in electrical input comprising a plurality of input delay lines each receiving said electrical input and each provided with spaced taps therealong wherein the spacing is different for each line to provide expanded and contracted versions of said electrical input, a plurality of sampling devices associated with each delay line and corresponding to the taps thereof, a common memory device having a plurality of memory elements, means for establishing a correlation threshold value, and means for comparing the electrical input at the taps of each delay line with the memory elements of said common memory and combining the contents of the sampling means corresponding to a particular delay line with memory when the comparison between the contents of memory and the sampling means associated with a particular delay line exceeds said threshold value.

9. An adaptive system for recognizing a repetitive signal of changing duration contained in electrical input comprising a plurality of input delay lines each receiving said electrical input and each provided with spaced taps therealong wherein the spacing is different for each line to provide expanded and contracted versions of said electrical input, a plurality of sampling capacitors normally coupled to said taps, a common memory comprising a plurality of memory capacitors, correlation circuitry including multipliers each receiving as inputs thereof the voltage from a particular delay line tap and a corresponding capacitor in memory, a summation circuit for each delay line receiving as inputs thereof the outputs of the multipliers coupled to its delay line taps, means for establishing a common threshold value, and switching circuitry for connecting the sampling capacitors normally coupled to the taps of a particular delay line to corresponding memory capacitors when the summation of multiplier outputs associated with the particular delay line exceeds said threshold value.

References Cited by the Examiner

UNITED STATES PATENTS

| | | | |
|---|---|---|---|
| 2,866,090 | 12/58 | Sherr | 328—149 X |
| 3,076,144 | 1/63 | Blasbalg | 328—147 |
| 3,111,645 | 11/63 | Milford | 328—135 X |

ARTHUR GAUSS, *Primary Examiner.*